Nov. 30, 1926.
J. H. RICE
1,608,529
CUTTING AND CLAMPING MECHANISM FOR KNITTING MACHINES
Filed Sept. 23, 1925    2 Sheets-Sheet 1
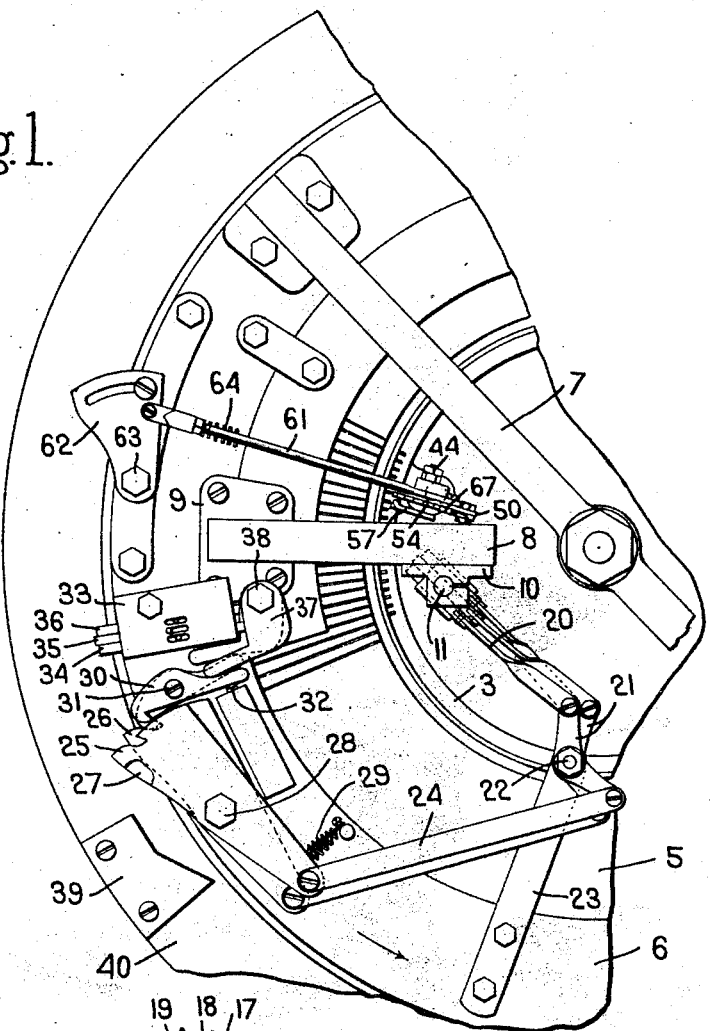
Inventor.
John H. Rice
by Heard Smith & Tennant.
Attys.

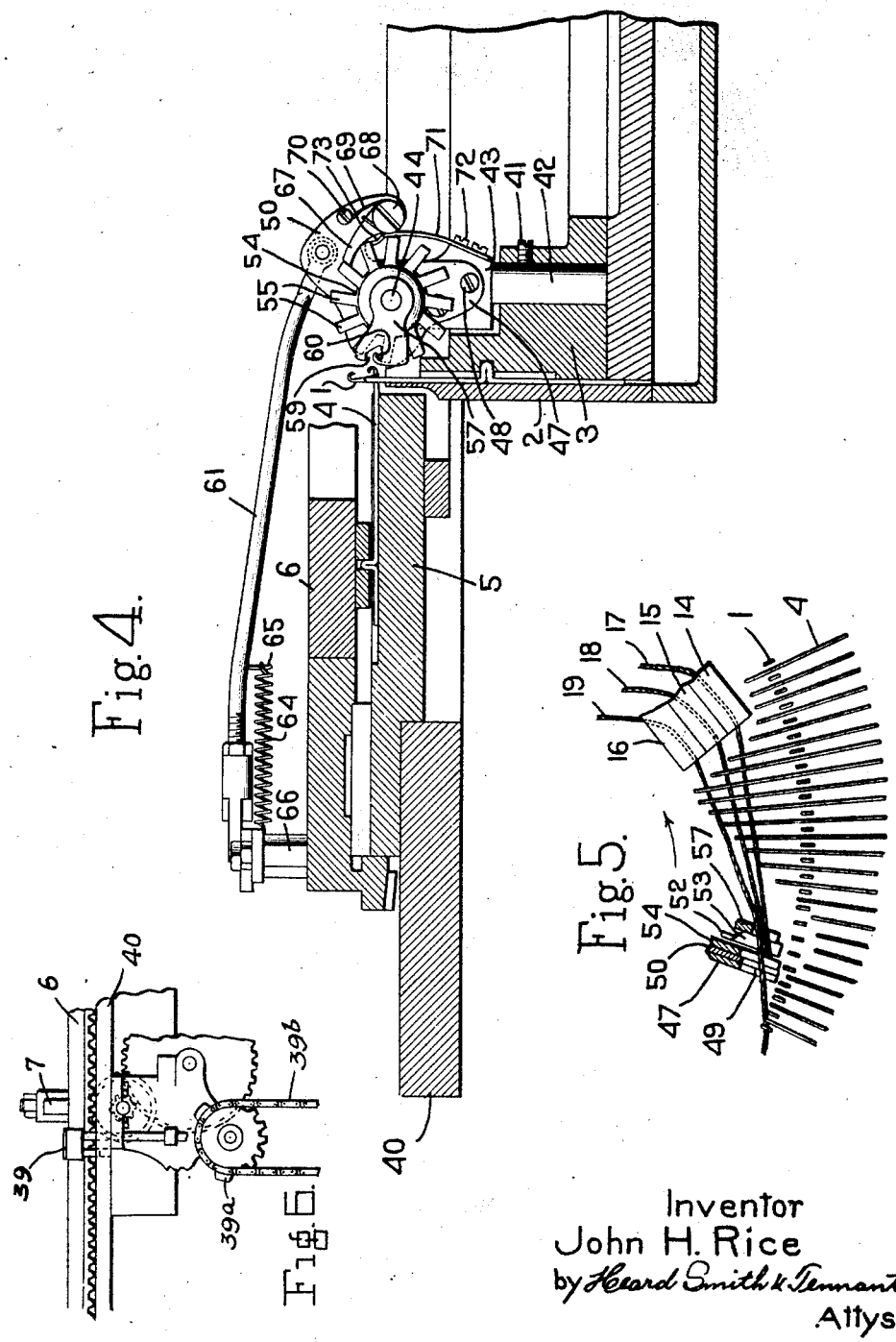

Patented Nov. 30, 1926.

1,608,529

UNITED STATES PATENT OFFICE.

JOHN H. RICE, OF MANCHESTER, NEW HAMPSHIRE, ASSIGNOR TO LEIGHTON MACHINE COMPANY, OF MANCHESTER, NEW HAMPSHIRE, A CORPORATION OF NEW HAMPSHIRE.

CUTTING AND CLAMPING MECHANISM FOR KNITTING MACHINES.

Application filed September 23, 1925. Serial No. 58,085.

This invention relates to the circular type of knitting machines provided with a plurality of more than two yarn feeding fingers to enable any one of these yarns to be employed in knitting.

The object of the invention is to provide in connection with such machine a cutting and clamping mechanism of such a character that, whenever either yarn feeding finger is moved to carry its yarn out of feeding position, the said yarn shall be severed and the end of the yarn extending to the said finger shall be clamped without releasing other yarns already clamped and held by the mechanism.

The nature and objects of the invention will appear more fully from the accompanying description and drawings and will be particularly pointed out in the claims.

The invention is applicable to various types of circular knitting machines in which the knitting needles and the cam cylinders have a relative rotation in the performance of the knitting operation. For convenience in illustrating a preferred embodiment of the invention the knitting machine shown is of the general type illustrated in my prior Patent No. 1,215,411 granted February 13, 1917.

Since the invention herein involved relates entirely to one feature of the knitting machine and since the construction and operation of the knitting machine itself is well known and familiar to those skilled in the art it is only necessary here to illustrate and describe those features of the machine directly concerned with an embodiment of the present invention.

Fig. 1 is a top plan view of a portion of a knitting machine of the type referred to with portions thereof removed or broken away and illustrating a preferred embodiment of the present invention;

Fig. 2 is a detail in perspective of a portion of the mechanism controlling the yarn-feeding fingers;

Fig. 3 is a detail on a larger scale looking toward the center of the machine and showing the position of the ends of the yarn-feeding fingers and the cutting and clamping mechanism with two yarns clamped and one yarn feeding;

Fig. 4 is a view chiefly in radial cross section of the construction shown in Fig. 1 and on a larger scale illustrating in side elevation the main elements of the cutting and clamping mechanism;

Fig. 5 is a plan view largely diagrammatic showing the position of the yarns in which two yarns are held clamped and the third yarn is just about to be cut and clamped;

Fig. 6 is a side elevation of a portion of the machine looking toward the cam 39 shown in Fig. 1.

The machine illustrated in the drawings comprises two circular series of knitting machine needles such as are employed in making ribbed knitting. The cylinder needles 1 slide vertically in the needle cylinder 2 and are operated by cams formed in the revolving cam cylinder 3. The dial needles 4 slide radially in the annular dial 5 and are given their movement by cams on the annular dial cam plate 6 all in a well known and familiar manner. The relative rotary movement between the two series of needles on the one hand and their respective operating cams on the other are secured in this case by maintaining the needle cylinder 2 and dial 5 stationary and rotating the cam cylinder 3 and dial cam plate 6 which are connected by the yoke 7.

The chief feature of the machine of interest in connection with this invention is a yarn-feeding mechanism arranged to feed either of a plurality of more than two yarns as may be required. Such a mechanism is illustrated for handling three yarns, it being understood, of course, that a single yarn may be made up of one or more yarns fed simultaneously. Since the particular construction of the yarn-feeding mechanism itself is not involved in the present invention it is also sufficient to illustrate and describe such a mechanism only to that extent necessary to a disclosure of the present invention which relates to the cutting and clamping mechanism. There may be as many yarn feeds as required each capable of feeding one or the other of three or more yarns. One such mechanism is illustrated.

A bracket 8 supported from the revoluble dial cam plate at 9 extends radially inward and serves as a support for the plurality of yarn-feeding fingers. At one side of the bracket 8 is mounted a block 10 in which is secured the vertical stud 11 of a housing 12. In this housing are fulcrumed at 13 three yarn-feeding fingers 14, 15 and 16. Each is in the form of a bell crank lever and each presents at the end a guide eye through which run some of the several yarns 17, 18 and 19 respectively. The bell crank levers at their upper ends are connected by links 20 to a set of bell crank levers 21 fulcrumed on a vertical stud 22 carried by a bracket 23 also supported from the dial cam plate. These bell crank levers 21 in turn are connected by links 24 to a corresponding series of superimposed levers 25, 26 and 27 having a common fulcrum 28 on the dial cam plate 6 and extending alongside the edge of the dial cam plate. Springs 29 connected to these levers and to the dial cam plate act normally to throw the free ends of the levers 25, 26 and 27 radially outward and through the connections described to depress the yarn-feeding fingers. Each finger is so positioned that when it is depressed the yarn fed therefrom is held so that it cannot be caught by the needle hooks and consequently is out of feeding position and when it is elevated the yarn is held in position to be caught by the needle hooks and consequently in feeding position. In Fig. 3 the yarn-feeding finger 15 is in feeding position and the yarn 19 is being caught by the needles 4 and knit while the yarn feeding fingers 16 and 14 are depressed and hold their respective yarns out of feeding position.

A generally familiar type of means for operating the yarn-feeding fingers to place them in or out of feeding position as required is illustrated. A plurality of dogs 30, one for each lever 25, 26 and 27, are fulcrumed at 31 on the dial cam plate and each is provided at its outer end with a hook adapted to engage in a corresponding notch in its lever when the free end of the lever is in its inner position or the position which holds the corresponding yarn feeding finger in feeding position. These dogs are normally held in locking position by spring-pressed plungers 32 engaging their tails and are moved to unlocking position selectively by a plunger construction illustrated. A casing 33 secured to the dial cam plate 6 has mounted for reciprocation therein plungers 34, 35 and 36 adapted respectively to press against the bell crank levers 37 fulcrumed at 38 on the dial cam plate and having their free ends in position to engage the tails of the respective dogs 30 which correspond to the levers 25, 26 and 27.

This yarn-feeding mechanism is under the control of suitable automatic mechanism such for example as the cam 39 mounted for vertical movement in the bed plate 40 of the machine and controlled by a suitable pattern or other automatic mechanism so as to be brought into vertical alignment with one or the other of the levers 25, 26 and 27. The ends of the plungers 34, 35 and 36 are formed as shown in Fig. 2 so that the cut-away portion of the end of each plunger is in the same plane as its corresponding lever 25, 26 or 27, while the solid portion of the ends of the other two plungers lie in the planes respectively of the other two corresponding levers. When, therefore, the yarn is to be changed, the cam 39 is shifted vertically into the path or plane of the outwardly projecting lever corresponding to the yarn feeding finger in action. As the cam cylinder revolves, this lever will first engage the cam 39 and will throw its yarn feeding finger upward and into action. As the rotation of the cam cylinder continues, the plungers will come opposite the cam. The plunger corresponding to the lever thrown in by the cam will not be operated but the plunger corresponding to the lever already in action, being projected outwardly, will strike the cam 39 and be moved inwardly, thus releasing the corresponding dog 30 and throwing the corresponding yarn finger downwardly to carry its yarn out of action. Referring, for example, specifically to the construction illustrated in Figs. 1, 2 and 3, the yarn 18 carried by the finger 15 is in action and the other two yarns are out of action. Assume now that it is desired to change yarns and introduce the yarn 17. The cam 39 is raised by the pattern mechanism into the path of the lever 25. As the cam cylinder revolves in the direction of the arrow shown in Fig. 1, this lever 25 comes against the cam 39 and is thrown inwardly, thus throwing the yarn finger 14 upwardly and causing the dog 30 to latch the lever 25 in its inward position. The yarns 17 and 18 are now knitting. But immediately the plungers come along opposite the cam 39. The plunger 34 is now projected but its cut-away portion comes opposite the cam 39 and so it is not moved and the yarn 17 remains in action. The solid part of the plunger 35 which is also projected now comes against the cam 39 and this plunger is forced inwardly releasing the lever 26, and the finger 15 with its yarn 18 is thrown out of action. The plunger 36 next comes opposite the cam 39, but as it is already at its inward position, it will not strike the cam, or if its solid part does strike the cam, the plunger will only be pressed further into the releasing position, thus making no change in the yarn finger 16. As the rotation continues, the lever 62 engages the cam 39 and the cutting and clamping mechanism is actuated to cut and clamp the end of the yarn 18.

A suitable form of pattern mechanism for shifting the cam vertically is shown in Fig. 6 and is of the same type as illustrated in my aforesaid Patent No. 1,215,411. The length and disposition of the high links 39ª on the pattern chain 39ᵇ driven by the usual gear drive from the cam plate 6 control the position of the cam 39.

The yarn cutting and clamping mechanism is carried by the needle cylinder and dial cam plate and this travels with the yarn-feeding fingers and is so located that it stands close to the work being knit and just in advance of the point where the yarn merges into the web. In the construction illustrated the cam cylinder 3 is provided with a socket in which is locked, by means of the set screw 41, a cylindrical standard 42 supporting the main elements of the cutting and clamping mechanism. This standard is flattened at its upper end at 43 and carries a stud 44 threaded at one end and provided with the lock nuts 45 and adapted to be locked in a rotary adjusted position in the standard by the set screw 46. This stud carries the main elements of the mechanism. A fixed cutter blade 47 fits over the stud and is held in place by a set screw 48. The cutting edge 49 of this blade extends radially close up to the path of the cylinder needles. On the stud 44 is pivoted an oscillatory cutter blade 50 having a cutting edge at 51 and adapted to co-operate with the cutting edge of the fixed cutter blade after the manner of a pair of shears.

A clamping blade 52 fixed or held against rotary movement is mounted upon or secured to the stud 44 and yields laterally slightly to permit the clamping action. This blade is shown as made of thin metal spun over at the outer end 53 to form a guiding surface. This surface normally stands about in line with the edge of the fixed cutter blade. Between the movable cutter blade 50 and the fixed clamping blade 52 there is rotatively mounted on the stud 44 the co-operating clamping blade 54. This blade 54 is in the form of a flat plate presenting a plurality of radial arms 55 each of which is adapted to co-operate with the fixed clamping blade 52 when brought opposite thereto during the rotation of the blade. The elasticity of the fixed clamping blade 52 reinforced by a small spring 56 acts to press the clamping blades into cooperation and ensure the clamping action. The end of the stud 44 has rigidly secured thereto a guide arm 57 separated from the fixed clamping blade by a spacer 58. At its forward end this guide arm is formed with a recess 59 to receive and position the yarn in the field of action of the clamping and cutting blades and this guide arm is also formed with a guard 60 at the mouth of the recess to prevent the clamped yarns from working out during the operation of the mechanism.

The mechanism is operated by a link 61 pivoted to the upper end of the movable cutter blade 50 and pivoted at its other end to a lever 62 fulcrumed at 63 on the dial cam plate. A helical spring 64 is connected at 65 to the link 61 and at its other end to a bracket 66 on the dial cam plate. The spring 64, therefore, acts to pull on the link 61 and rock the movable cutter member into cutting co-operation with the fixed cutter member. A suitable cam under control of suitable pattern mechanism such as the cam 39 engaging the lever 62 (which is of sufficient depth at its outer face to be in the path of the cam in either of the vertical positions of the cam) rocks the movable cutter member into open position and as the lever 62 passes the cam the spring immediately acts to close the movable cutter member and effect the cutting operation.

The operation of the clamping mechanism is preferably secured by operating the movable clamping member from and simultaneously with the movable cutter member. This operation is conveniently secured by utilizing the radial arms of the rotary clamping member as a sprocket and providing a ratchet pawl on the oscillatory cutter blade to co-operate therewith. Such a pawl 67 is shown pivotally mounted by means of the stud 68 on the movable cutter blade 50 so that the pawl will co-operate with the rear edges of the radial arms 55. A spring 69 secured at 70 to the blade 50, passed around the stud 68 and hooking over the pawl acts to hold the pawl yieldingly in engagement with the arms 55. A spring detent 71 secured at 72 to the top 43 of the standard has an inclined head 73 projecting between the arms 55 and acting to permit rotation of the rotary clamping blade in a clamping direction but to prevent reverse rotation. It will thus be seen that when the lever 62 is struck by an actuating cam the oscillatory cutter blade 50 is swung to open position, the rotary clamping blade being held against rotation by the detent 71 and the pawl 67 riding over and catching behind one of the arms 55. Immediately the lever 62 has passed the actuating cam the spring 64 acts to swing the movable cutter blade forwardly causing the co-operation of the cutting edge thereof with the cutting edge of the fixed cutter blade 47. Simultaneously the pawl 67 rotates the rotary clamping blade one step bringing one of the arms 55 opposite the fixed clamping blade 52 which yields slightly laterally. Any yarn that is in the field of operation of the mechanism is, therefore, cut and the end clamped in between the arm 55 and the co-operating blade 54.

It follows, therefore, that when such a cutting and clamping of a yarn has taken place that a succeeding operation of the mechanism in which the movable cutter blade is brought to open position does not release the grip of the clamping members on the yarn because such movement of the movable cutter blade does not move the rotary clamping blade. Furthermore, when the movable cutter blade oscillates forward to perform its cutting function the clamping action of the clamping members upon the yarn is not disturbed because while the movable clamping blade is rotated one step in this operation the arm 55 next brought alongside the fixed clamping blade 52 grips the yarn before the preceding arm 55 moves sufficiently to release its grip on the yarn. The fixed clamping blade 52 must, therefore, be of sufficient depth to enable two adjacent arms 55 of the rotary clamping member to co-operate with this blade 52. When a yarn is thrown into action, the needle which first catches it soon passes the clamp due to the relative rotary movement and the yarn breaks between this needle and the clamp.

While means have been provided as shown in Patent No. 1,215,411 above mentioned capable of cutting and clamping one of two yarns such means are not available when three or more yarns are to be controlled because the clamping of a yarn by the mechanism releases or unclamps the previously clamped yarn. In the present invention it makes no difference how many yarns are being held out of feeding position by the clamping members. A succeeding operation of the cutting and clamping mechanism cuts the yarn and clamps it without releasing any yarn previously clamped. The recess 59 in the guide arm 57 serves to direct a yarn, when its feeding finger is moved out of position, into the field of action of the cutting and clamping members and the guard 60 serves as a precaution against yarns already clamped between the clamping members working out radially as the step by step rotation of the rotary clamping blade takes place and additional yarns are cut and clamped.

I claim:

1. A cutting and clamping mechanism for a knitting machine comprising a fixed clamping member and a rotary clamping member having a plurality of radial arms each successively co-operating with the fixed clamping member to clamp a yarn placed in the field of action of the clamping members without releasing a yarn previously clamped thereby.

2. A cutting and clamping mechanism for a knitting machine comprising a fixed cutter blade, a fixed clamping member, a co-operating movable cutting and clamping means acting when moved to sever and clamp a yarn placed in the field of action of said mechanism without releasing a yarn previously clamped therein.

3. A cutting and clamping mechanism for a knitting machine comprising a fixed cutter blade, a fixed clamping blade, an oscillatory cutter blade co-operating with the fixed cutter blade, a rotary clamping blade having a plurality of radial arms each successively co-operating with the fixed clamping blade, and means to rotate the rotary clamping blade one step upon each cutting movement to effect co-operative clamping action of a radial arm with the fixed clamping blade.

4. A cutting and clamping mechanism for a knitting machine comprising the construction defined in claim 3 in which the means for actuating the rotary clamping blade is actuated from the oscillatory cutter blade.

5. A cutting and clamping mechanism for a knitting machine comprising the construction defined in claim 3 together with a guide member mounted adjacent the cutting and clamping elements and having a recess to receive and position the yarn in the proper field of action.

6. A cutting and clamping mechanism for a knitting machine comprising the construction defined in claim 3 together with a guide member mounted adjacent the cutting and clamping elements and having a recess to receive and position the yarn in the proper field of action and with a guard at the mouth of the recess to prevent the clamped yarns from working out during subsequent and clamping operations.

7. A cutting and clamping mechanism for a knitting machine comprising a fixed cutter blade, a fixed clamping blade, an oscillatory cutter blade co-operating with the fixed cutter blade, means for oscillating said oscillating cutter blade when it is desired to cut and clamp a yarn, a rotary clamping blade having a plurality of radial arms each successively co-operating with the fixed clamping blade, and a pawl yieldingly mounted on the oscillatory cutter blade and co-operating with the said radial arms to effect rotation of the radial clamping blade one step upon each cutting movement and thereby cause the co-operating clamping action of a rotary arm with the fixed clamping blade.

8. A cutting and clamping mechanism for a knitting machine comprising a fixed clamping member and a rotary clamping member having a plurality of radial arms equally spaced apart and two of which are always in co-operative clamping relation to the fixed clamping member, whereby when the rotary clamping member is rotated one step to clamp the yarn the clamping action takes place without the release of previously clamped yarns.

In testimony whereof, I have signed my name to this specification.

JOHN H. RICE.